United States Patent [19]

Ishida et al.

[11] 3,898,462
[45] Aug. 5, 1975

[54] INFRARED GAS ANALYZER

[76] Inventors: Kozo Ishida; Toshio Shimazaki; Fumio Tanei; Taizo Yagi, all c/o Horiba, Ltd., Miyanohigashi, Kisshoin. Minami-ku, Kyoto, Japan

[22] Filed: Dec. 20, 1973

[21] Appl. No.: 426,440

[30] Foreign Application Priority Data
Dec. 20, 1972 Japan.............................. 47-127977

[52] U.S. Cl................................. 250/344; 250/350
[51] Int. Cl. .......................................... G01n 21/26
[58] Field of Search .......... 250/252, 338, 339, 340, 250/344, 345

[56] References Cited
UNITED STATES PATENTS

| | | | |
|---|---|---|---|
| 3,130,302 | 4/1964 | Liston et al. | 250/344 |
| 3,215,832 | 11/1965 | Madsen et al. | 250/344 |
| 3,808,436 | 4/1974 | Risgin et al. | 250/344 |

Primary Examiner—Eli Lieberman
Attorney, Agent, or Firm—Allan M. Shapiro

[57] ABSTRACT

An improved infrared gas analyzer is provided which permits detection and accurate measurement of each of a plurality of components in a sample gas despite any interfering absorption bands of those components.

19 Claims, 5 Drawing Figures

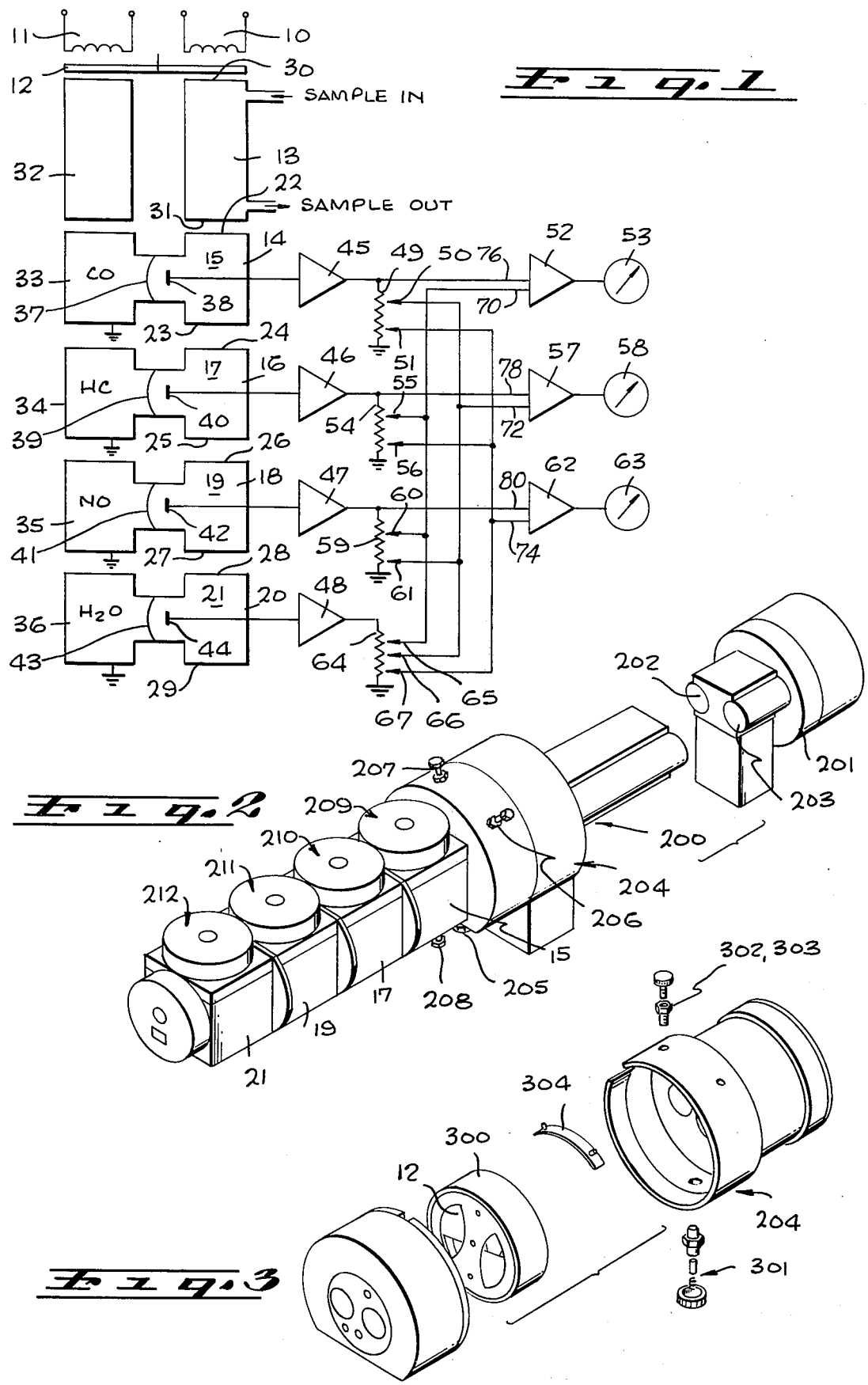

INFRARED GAS ANALYZER

BACKGROUND OF THE INVENTION

1. Field of the Invention

This invention relates to positive, non-dispersion infrared analyzers for materials in a gaseous state.

2. Description of the Prior Art

Infrared gas analyzers depending upon the distinctive absorption spectra of materials in the gaseous state are well known in the art. However, in general, they have been designed to permit the detection and measurement of only a single component of a sample gas at a time. Some efforts have been made to provide analyzers that are capable of detecting and measuring each of a plurality of components in a sample gas. For example, see British Patent Specification No. 645,576, published in complete form on Nov. 1, 1950. One deterrent to the simultaneous measurement described in that Bristish Patent Specification is the well known fact that, while a particular substance in a gaseous state has a principal absorption band in the infrared spectrum it also has lower absorption sidebands and either the main absorption band or the sidebands may overlap the principal absorption band of a second gaseous substance the detection and measurement of which is desired. The existence of these interfering absorption bands and a method to compensate for them when seeking to detect and measure a single component of a sample gas are set forth in U.S. Pat. No. 2,924,713 issued Feb. 9, 1960, the patentee being Max D. Liston.

However, this method is not properly applicable to simultaneous detection and measurement of each of a plurality of components in a gaseous mixture because its primary mode of operation is to adjust, by means of a shutter, the total flow of energy from the infrared source. Such action would not permit proper operation of an optical series of detectors for each of a plurality of gaseous components, as contemplated by this invention.

Other methods for elimination of interfering absorption characteristics, such as the use of infrared bandpass filters centered at a single frequency corresponding to the known center of an absorption band for a gas component to be detected, or blocking filters which absorb energy in the known interfering bands, are obviously not applicable to a system for simultaneous detection and measurement of each of a plurality of components in a gaseous mixture.

SUMMARY OF THE INVENTION

It is a general object of this invention to overcome the problems set forth hereinbefore.

It is a more specific object of this invention to provide an improved infrared gas analyzer.

It is a still further object of this invention to provide an improved gas analyzer which permits the simultaneous detection and measurement of each of a plurality of materials in a gaseous mixture with minimal errors from overlapping in the absorption characteristics of the plurality of materials.

Other objects of this invention will become apparent in the further course of this disclosure.

The subject invention resides in infrared gas analyzing apparatus for permitting the simultaneous detection and measurement of a plurality of components in a gaseous mixture despite the existence of overlapping and consequently interfering absorption bands of the components in the gaseous mixture. More specifically, a plurality of component detectors is provided, the number of detectors corresponding to the number of gaseous components to be detected and measured. Each of these detectors has two chambers separated by a diaphram, both chambers being filled with one of the gaseous substances expected to be found in the gaseous mixture to be analyzed. Each of the chambers has a window on each of its ends in the direction of energy flow from two sources of infrared energy, each of the chambers being optically aligned with one of the two energy sources, the detectors being arranged in optical series along the path of the energy from such sources. Between the energy sources and the detectors and lying along the paths of energy from those sources are two cells having ends which are transparent to the energy so that the energy may flow through the cells and on through the detectors. One of these cells contains a reference gas, the other is adapted for the introduction thereto of the gas to be analyzed.

A mechanical modulator or chopper is interposed between the energy sources and the cells to interrupt, intermittently, the beams of energy flowing through said cells and said chambers.

Each detector includes, in addition to the diaphragm a second conductive element insulated electrically from the diaphragm and to which an electrical d.c. potential may be applied to cause the combination to act as a condenser microphone. The output signal from each detector has combined therewith, either at an a.c. or d.c. level, a portion of the output signal from each other detector in a phase or sign opposite to that of the principal signal from each detector, the magnitude of such portion applied being sufficient to offset that portion of the total signal from each detector corresponding to the extraneous or interference signal created by the existence in the sample being analyzed of gases having an absorption band or sideband interfering with the absorption band for the gaseous material to which the principal signal corresponds.

BRIEF DESCRIPTION OF THE DRAWINGS

FIG. 1 is a schematic diagram of a first form of this invention;

FIG. 2 is an assembly drawing of apparatus corresponding to the schematic diagram of FIG. 1;

FIG. 3 is an exploded view of a portion of the apparatus of FIG. 2;

DETAILED DESCRIPTION OF THE PREFERRED EMBODIMENT

Figure 5:
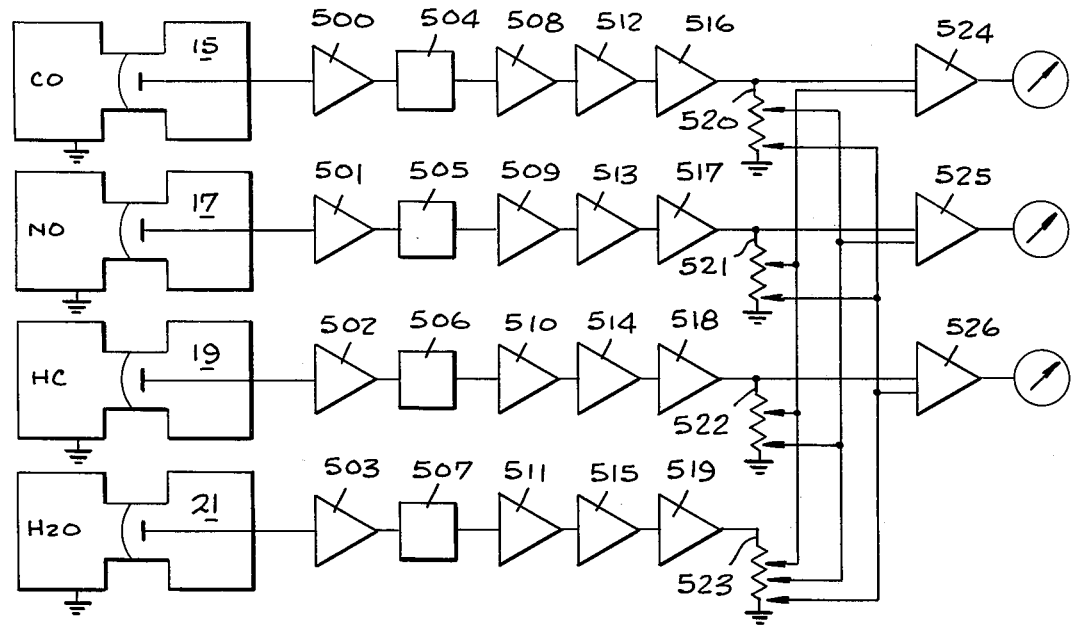
FIG. 5 is a schematic diagram of an additional embodiment of the present invention.

In FIG. 1, sources 10 and 11 of infrared energy may be of any one of a number of types well known in the art which require no description here. Columnating means, not shown, may be provided, if desired. Chopper element 12 may be of the type described in U.S. Pat. No. 3,729,264 entitled ANALYZER USING THE ROTOR OF A MOTOR AS A LIGHT CHOPPER, issued Apr. 24, 1973 and assigned to the same assignee as this application. That chopper has a diaghragm with sector-shaped apertures therein disposed 180° apart.

The diaphragm, as it rotates, permits intermittent passage of energy from sources 10 and 11 to and through subsequent optically aligned elements. Energy from source 10 intermittently flows through sample cell 13, chamber 14 of detector 15, chamber 16 of detector 17, chamber 18 of detector 19 and chamber 20 of detector 21. Such energy passage is possible by reason of gas impervious but energy transparent windows 22 through 31. Chambers 14, 16, 18 and 20 are optically aligned with sample cell 13 which, in turn, is optically aligned with source 10.

Similarly, energy from source 11 passes (when chopper 12 permits) through reference cell 32 and chambers 33 through 36, all of those elements being in optical alignment.

Reference cell 32 may be filled with nitrogen or argon gas. Each of the chambers in the detectors is filled with one of the gaseous materials to be detected and measured in the sample, diluted by a "zero gas" such as that in reference cell 32. For example, in the embodiment shown in FIG. 1, with cell 32 filled with argon detector 15 may be filled with 5 percent CO and 95 percent argon; detector 17 may be filled with 5 percent n-hexane and 95 percent argon; detector 19 may be filled with 5 percent NO and 95 percent argon; and detector 21 may be filled with 5 percent water vapor and 95 percent argon.

Detector 15 contains thin diaphragm 37 and electrode 38 spaced and electrically insulated therefrom.

Detector 17 contains diaphragm 39 and electrode 40 spaced and electrically insulated therefrom.

Detector 19 contains diaphragm 41 and elecrode 42 spaced and electrically insulated therefrom.

Detector 21 contains diaphragm 43 and electrode 44 spaced and electrically insulated therefrom.

Each of the combinations of a diaphragm and an electrode constitutes a condenser, and, with the proper application of a d.c. potential difference therebetween, a condenser microphone. Amplifier 45 includes means for applying the exciting potential to the condenser microphone in detector 15. Amplifier 46 includes means for applying the exciting potential to the condenser microphone in detector 17.

Amplifier 47 includes means for providing the exciting potential to the condenser microphone in detector 19.

Amplifier 48 includes means for providing the exciting potential to the condenser microphone in detector 21.

Any motion and specifically a periodic motion between any electrode and its associated diaphragm will produce a signal output from that combination which will be amplified by its associated amplifier.

Specifically, motion between diaphragm 37 and electrode 38 will produce a signal that will be amplified by amplifier 45 and the resulting signal will be applied to potential divider 49 having adjustable taps 50 and 51, and to adder 52 the output of which is applied to CO indicator 53.

Motion between diaphragm 39 and electrode 40 produces a signal which is amplified by amplifier 46 and applied to potential divider 54 which has adjustable taps 55 and 56 thereon. Additionally the output signal from amplifier 46 is applied to adder 57, the output of which is indicated by HC indicator 58.

Relative motion between diaphragm 41 and electrode 42 results in a signal which is amplified by amplifier 47, the resulting signal being applied to potential divider 59, having variable taps 60 and 61 thereon, and to adder 62, the output of which is presented on NO indicator 63.

Similarly, relative motion between diaphragm 43 and electrode 44 results in a signal which is amplified by amplifier 48 and is applied to potential divider 64, having adjustable taps 65, 66 and 67.

The apparatus of FIG. 1 operates as follows. With energy sources 10 and 11 and chopper element 12 operating a calibration gas mixture of a specific and known composition is fed into cell 13 for calibration of the individual detectors and the overall apparatus. The calibration mixture has an equal amount of CO, NO and HC diluted with nitrogen gas, for example. The sensitivity of each detector is adjusted as by adjusting the potentials applied to the respective diaphragm-electrode combinations so that readings occur on indicators 53, 58 and 63 roughly corresponding to the known concentrations of the component gases to be measured. It should be noted that output from any detector is a result of differences in pressure on opposite sides of the diaphragm in each detector as energy from sources 10 and 11 intermittently flows into their associated chambers in each detector and is absorbed at the wavelength characteristic for absorption by the gas in that particular detector.

From the practical operational standpoint, water vapor, in varying concentrations, is present in every sample gas mixture. Therefore, it is intentionally included in the calibration gas mixture. Water vapor has infrared absorption bands overlapping the absorption bands of CO, NO and HC. Therefore, it is necessary that the portion of the output signals from the respective amplifiers 45, 46 and 47, resulting from the absorption of infrared energy (and, hence, resultant heating and expansion of the gases in their respective chambers) by water vapor in the principal absorption spectra of CO, NO and HC, respectively, be eliminated as completely as possible.

When the calibration gas of known constituency is passed through chamber 13, the water vapor content thereof will produce a periodic electrical output signal from detector 29, such signal having an a.c. component which will be amplified by amplifier 48 and will produce, across voltage divider 64, an a.c. output signal representative of the water vapor content of the calibration gas. The absorption of the water vapor will not equally affect the CO, HC and NO detectors and, thus, the portion of the water vapor signal which must be applied, out-of-phase, to each of the adding or summing amplifiers 52, 57 and 62 in order to achieve accurate gas sample analysis will vary, requiring adjustability of the take-off points or taps 65, 66 and 67 from the voltage divider 64 for combining with the detector output signals at the summing amplifiers 52, 57 and 62 in a subtractive phase with respect to the principal signal from the respective detectors, until the proper reading of each indicator 53, 58 and 63 is closely approximated, knowing the composition of the calibration gas. Summing amplifiers, such as amplifiers 52, 57 and 62, are well known in the art and need not be described here.

While water vapor may be the principal offender in preventing accurate measurement of principal gas content, CO, HC and NO, although they have their principal absorption bands at 4.3 microns, 3.5 microns and 5.3 microns, respectively, each has absorption sidebands or "backgrounds" which interfere with the accurate measurement of other gaseous materials present in a sample mixture. These sidebands produce signal outputs from the respective detectors which are higher than they should be, as does water vapor, for, as has been described, signal output from the detectors results from infrared absorption, heat rise and consequent pressure rise in a chamber. That pressure rise in a chamber produces deflection of the respective condenser microphone diaphragms 37, 39 and 41 as chopper 12 rotates.

An a.c. signal representative of NO sidebands in the CO absorption band is taken from adjustable tap 61 and combined, in substractive fashion, at adder 52 with the CO detector signal from amplifier 45 to further refine the accuracy of the reading on indicator 53.

Similarly, an a.c. signal representative of NO sidebands in the HC absorption spectrum is subtracted from the HC detector output signal derived from amplifier 46, this process occurring in summing amplifier 57, its purpose being to refine the accuracy of HC indicator 58.

CO and HC sideband signals are combined with each other in-phase and additively and with signals from the NO detector out-of-phase and subtractively, by reason of the action of summing amplifier 62, to give a corrected reading of NO indicator 63.

The connections between voltage dividers 49, 54, 59 and 64, on the one hand, and the correction or interference signal input lines 70, 72 and 74 are symbolic to the extent that the correction or interference signals are summed with respect to each other in adders 52, 57 and 62, but that sum is inverted and added out-of-phase with respect to the principal detector output voltages supplied to the principal voltage input terminals of the adders, by way of conductors 76, 78 and 80. The importance of properly phasing the respective signals, and how that is accomplished is set forth more fully hereinafter.

The correcting signals applied to adders are inverted in phase at the adder before being combined with the principal signal from each detector to cancel out any extraneous component and assure an accurate reading of a specific gas content of a sample. Thus, the phase relationship between the primary signal and the correcting signal or signals is important. The mechanical method for phase adjustment is set forth in FIGS. 2 and 3 and the electrical method for phase adjustment is set forth in connection with FIG. 4.

In FIG. 2, for simplification of mechanical construction, chopper element 12 of FIG. 1 follows, rather than precedes, sample and reference cells 13 and 32 which are included in the designation 200 (the cell section) in FIG. 2. Chopper element 12 appears more clearly in FIG. 3.

Continuing with the description of FIG. 2, energy source section 201 includes source 10 and 11 of FIG. 1.

The energy from energy source section 201 emerges at ports 202 and 203 which are optically aligned with cells 13 and 32 in cell section 200. Chopper section 204 has a chopper element fixing screw 205 and chopper element shifting screws 206 and 207.

Detectors 15, 17, 19 and 21 are optically aligned at the output side of chopper section 204. A light-intersecting-plate fixing screw is provided at 208.

A combination of amplifier 45, potential divider 49 and adder 52 appears as unit 209.

A combination of amplifier 46, potential divider 54 and adder 57 appears as unit 210.

A combination of amplifier 47, potential divider 59 and adder 62 appears as unit 211.

A combination of amplifier 48 and potential divider 64 appears as unit 212.

In FIG. 3 chopper section 204 includes chopper element 12 supported within chopper motor frame 300 and caused to rotate as described in U.S. Pat. No. 3,729,264. Frame 300 is held within chopper section 204 by adjustable screw assembly 301 cooperating with shifting screws 302 and 303 which are connected to holder 304. The phase of the signal from detector 15 is adjusted by adjusting shifting screws 302 and 303 and fixing the adjustment with screw assembly 301.

To change the phase of the output signals from detectors 17, 19, and 21 adjustment of the infrared beam intensity is made by means of a light intersecting plate, not shown, which is fixed by screw 208 in FIG. 2. By these mechanical adjustments fine phasing adjustments may be made in the output signals from each detector to permit their combination at reduced level in the process of cancelling out interference effects at the adder level.

Figure 4:
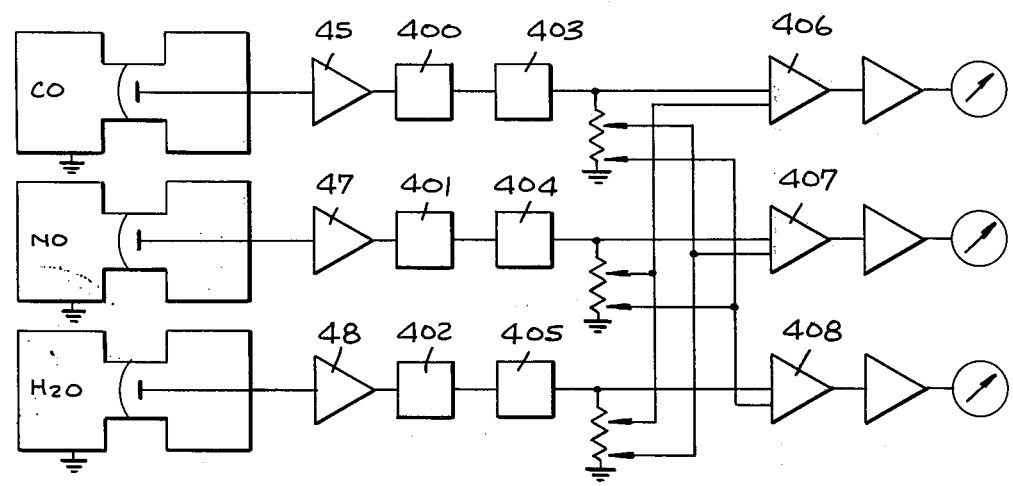
FIG. 4 is a schematic diagram of an alternative form of the present invention.

In FIG. 4 phase adjustments in the output signals from each detector are accomplished electronically. For purposes of simplification the CH detector is not shown.

The A.C. signals out of amplifiers 45, 47 and 48 are fed to phase detectors 400, 401 and 402, respectively. The output signals from phase detectors 400, 401 and 402 are fed to phase shifting circuits 403, 404 and 405, respectively and circuits 403 and 404 are adjusted to delay the phase of signals passing therethrough to correspond to the phase of the most lagging signal, that being from the last detector, here the water vapor detector. The phases of the signals are observed on an oscilloscope during this adjustment process. After the phases of the signals are adjusted to correspond to each other the proper proportion of the signal from each detector is combined, out of phase, with the principal signal from each detector to remove signals corresponding to interfering absorption bands. This combination takes place in the adders 406, 407 and 408, as described previously. The remainder of the circuit performs the same as that of FIG. 3 and need not be dealt with further here.

In FIG. 5 phasing problems are eliminated by converting the principal, desired signals and the interference or spurious signals into direct current before combining with reversed polarity.

In FIG. 5 signals corresponding to detected gases but including spurious signals resulting from overlapping primary absorption or background bands are taken from detectors 15, 17, 19 and 21 and are fed into pre-amplifiers 500, 501, 502 and 503, respectively, the output from those pre-amplifiers being filtered by filters 504, 505, 506 and 507 to remove noise. Following filtering the signals are passed to their respective main A.C. amplifiers 508 through 511. The amplified A.C. signals are then converted to direct current by rectifier stages 512 through 515, respectively and then passed through their respective direct current amplifiers 516 through 519. At the output of the direct current amplifiers are potential dividers 520 through 523 which have adjustable taps as did the dividers of FIG. 1 and for the same purposes; i.e., to select voltage levels corresponding to spurious or interference absorption phenomena during the calibration process described in connection with FIG. 1 and to add these undesired voltages with opposite polarity in adders 524 through 526 so as to produce direct current voltage levels which may be fed to indicators 527, 528 and 529 to represent accurately the existence and concentration of individual component gases in gas mixtures being analyzed.

While a particular embodiment has been described, modifications may be made within the scope of the invention. The following claims are intended to cover such embodiments.

What is claimed is:

1. In apparatus capable of simultaneously measuring by energy absorption each of a plurality of components in a mixture of materials in a gaseous state despite any interfering energy absorbing characteristics of those components, the improvement which includes, in combination:

voltage producing means for producing for each of said plurality of components a first voltage including a principal voltage and a first composite interference voltage; said voltage producing means comprising a plurality of optically aligned gas detectors, one for each component in the mixture to be measured;

means for producing for each of said components said plurality of interference voltages each representing the interference of that component with a respective one of the other components to be measured;

means for combining the interference voltages from each component related to a given other component to provide a second composite interference voltage corresponding to the magnitude of said first composite interference voltage for each component to be measured; and, cancelling means for combining said first and second composite interference voltages with opposing senses.

2. Apparatus according to claim 1 in which said means for producing a plurality of interference voltages includes potential dividers with adjustable taps.

3. Apparatus according to claim 1 in which said cancelling means includes a voltage adding circuit.

4. Apparatus according to claim 1 in which said voltage producing means includes phase shifting means.

5. Apparatus according to claim 1 in which said voltage producing means includes phase detecting means and phase shifting means coupled to said phase detecting means.

6. Apparatus according to claim 1 in which said voltage producing means produces direct current voltages.

7. Apparatus according to claim 1 in which said principal voltage, said first composite voltage and said second composite voltage are direct current to voltages.

8. Apparatus according to claim 1 in which said voltage producing means includes a filter, a rectifier coupled to said filter and a direct current amplifier coupled to said rectifier.

9. Apparatus according to claim 1 in which said voltage producing means includes a plurality of energy sources each having an axis; a sample gas cell lying along an extension of the axis of one of said plurality of energy sources and adapted to receive a mixture of a plurality of gases; a reference gas cell lying along an extension of the axis of a second of said plurality of energy sources; said sample and reference gas cells having ends normal to said extensions of said axes and being transparent to the energy from said sources; said plurality of detectors each having first and second chambers, said first and second chambers having end closures transparent to said energy; said first chambers being in optical alignment with said first energy source; said second chambers being in optical alignment with said second energy source; each of said chambers containing a predetermined gaseous material; a flexible metallic diaphragm separating said first and second chambers in each of said detectors; said first chambers each including an electrode proximate to but spaced from and electrically insulated from said diaphragm in said detector; means interposed between said energy sources and said detectors for chopping the energy from each of said sources before it enters said detectors; and means coupled to each of said detectors for applying a potential between each of said electrodes and its associated diaphragm.

10. An infrared analyzer for measuring, simultaneously and accurately, the level of content of each of several principal gases in a mixture of gases, where such gases may have overlapping infrared energy absorption spectra and may be mixed with water vapor, which includes:

a detector for each of the principal gases in said mixtures, each of said detectors producing an output voltage corresponding to the absorption of infrared energy at the primary absorption wavelength of a respective one of said principal gases;

a detector for water vapor producing an output voltage corresponding to the absorption of infrared energy by water vapor;

each of said detectors having coupled thereto its respective voltage divider with multiple, adjustable taps thereon;

a plurality of summing amplifiers each having a principal voltage input terminal and at least one interference voltage input terminal, each of such plurality of summing amplifiers having its principal voltage input terminal coupled to a respective one of said principal gas detectors;

said voltage divider coupled to said water vapor detector having said output taps on said voltage divider coupled to one of said interference voltage input terminals on each of said summing amplifiers;

coupling means between each of said adjustable taps on each voltage divider coupled to a principal gas detector and an interference voltage input terminal on the summing amplifier coupled to each of the other principal gas detectors;

a principal gas content indicator coupled to each summing amplifier; and said adjustable taps being positioned to assure readings on said gas content indicators which represent the respective gas content only.

11. Apparatus according to claim 10 in which means are provided for adjusting the phases of the output voltages from each detector.

12. Apparatus according to claim 11 in which said phase adjusting means are mechanical.

13. Apparatus according to claim 11 in which said phase adjusting means are electrical.

14. Apparatus according to claim 10 in which the voltages applied to said principal voltage and interference voltage input terminals are a.c. voltages.

15. Apparatus according to claim 10 in which the voltages applied to said principal voltage and interference voltage input terminals are d. c. voltages.

16. Apparatus according to claim 10 in which said detectors for principal gases and water vapor include phase detectors.

17. Apparatus according to claim 10 in which said detectors for principal gases and water vapor each includes a filter, a rectifier coupled to said filter and a direct current amplifier coupled to said rectifier.

18. Apparatus according to claim 10 in which said principal gases are CO, NO and HC.

19. Apparatus according to claim 10 in which said detectors include optically aligned chambers individually containing samples of the principal gases and water vapor.

* * * * *